United States Patent
Rosenblum et al.

(10) Patent No.: US 12,367,253 B2
(45) Date of Patent: **\*Jul. 22, 2025**

(54) SIMPLIFIED WEBSITE CREATION, CONFIGURATION, AND CUSTOMIZATION SYSTEM

(71) Applicant: MH SUB I, LLC, El Segundo, CA (US)

(72) Inventors: Joseph A. Rosenblum, Santa Monica, CA (US); Kevin Sours, College Park, MD (US); Neal Sainani, Los Angeles, CA (US); Alan Chiu, Los Angeles, CA (US); Fabian Schonholz, Thousand Oaks, CA (US)

(73) Assignee: Internet Brands, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,859

(22) Filed: Oct. 17, 2022

(65) Prior Publication Data

US 2023/0111594 A1    Apr. 13, 2023

Related U.S. Application Data

(63) Continuation of application No. 15/919,056, filed on Mar. 12, 2018, now Pat. No. 11,475,097, which is a continuation of application No. 14/328,639, filed on Jul. 10, 2014, now Pat. No. 9,916,388.

(60) Provisional application No. 61/844,837, filed on Jul. 10, 2013.

(51) Int. Cl.
*G06F 16/958* (2019.01)

(52) U.S. Cl.
CPC .......... *G06F 16/972* (2019.01); *G06F 16/958* (2019.01)

(58) Field of Classification Search
CPC ......... G06F 16/958; G06F 16/972; G06F 8/34
See application file for complete search history.

(56) References Cited

U.S. PATENT DOCUMENTS

| | | | |
|---|---|---|---|
| 7,243,335 B1 * | 7/2007 | Andrew | G06F 8/38 717/115 |
| 8,086,963 B2 | 12/2011 | Collins et al. | |
| 8,924,876 B1 | 12/2014 | Joyce et al. | |

(Continued)

OTHER PUBLICATIONS

U.S. Appl. No. 14/328,639, filed Jul. 10, 2014 Non-Final Office Action dated Aug. 2, 2017.

(Continued)

*Primary Examiner* — Daniel Samwel
(74) *Attorney, Agent, or Firm* — Rutan & Tucker, LLP

(57) ABSTRACT

A system and method for creating a web page or web site including dynamically-generating content, such as a forum, using a framing layout and a series of modules arrangeable within. An interface allows the selection and placement of modules of various types in a simulation of a web page, and configuration data for each module may be set. A layout, or plurality of possible layouts, defines sections into which the modules may be placed. Pages may be organized in a hierarchy such that features of a template page are applied to any page underneath it in the hierarchy. The interface or other component of the system may further allow for the development of additional modules and layouts to be added to the available selection.

19 Claims, 5 Drawing Sheets

(56) References Cited

U.S. PATENT DOCUMENTS

| | | |
|---|---|---|
| 9,916,388 B2 | 3/2018 | Rosenblum et al. |
| 11,475,097 B1 | 10/2022 | Rosenblum et al. |
| 2002/0059327 A1 | 5/2002 | Starkey |
| 2007/0162845 A1* | 7/2007 | Cave ............... G06F 40/117 715/764 |
| 2008/0109472 A1* | 5/2008 | Underwood ........ G06Q 30/02 707/999.102 |
| 2008/0172608 A1 | 7/2008 | Patrawala et al. |
| 2009/0013244 A1* | 1/2009 | Cudich ............... G06F 40/10 715/234 |
| 2010/0037168 A1* | 2/2010 | Thayne ............. G06F 40/166 715/769 |
| 2012/0174002 A1* | 7/2012 | Martin ............... G06F 9/451 715/763 |
| 2013/0159892 A1* | 6/2013 | Suraj ................ G06F 16/958 715/762 |
| 2014/0136935 A1* | 5/2014 | Santillie ............. G06Q 10/10 715/204 |
| 2014/0258836 A1* | 9/2014 | Horton .............. G06F 3/0486 715/234 |
| 2015/0020004 A1 | 1/2015 | Rosenblum et al. |

OTHER PUBLICATIONS

U.S. Appl. No. 14/328,639, filed Jul. 10, 2014 Notice of Allowance dated Nov. 20, 2017.

U.S. Appl. No. 15/919,056, filed Mar. 12, 2018 Advisory Action dated Sep. 28, 2020.

U.S. Appl. No. 15/919,056, filed Mar. 12, 2018 Final Office Action dated Jun. 16, 2020.

U.S. Appl. No. 15/919,056, filed Mar. 12, 2018 Final Office Action dated Nov. 30, 2021.

U.S. Appl. No. 15/919,056, filed Mar. 12, 2018 Non-Final Office Action dated Apr. 28, 2021.

U.S. Appl. No. 15/919,056, filed Mar. 12, 2018 Non-Final Office Action dated Dec. 12, 2019.

U.S. Appl. No. 15/919,056, filed Mar. 12, 2018 Notice of Allowance dated Jun. 14, 2022.

* cited by examiner

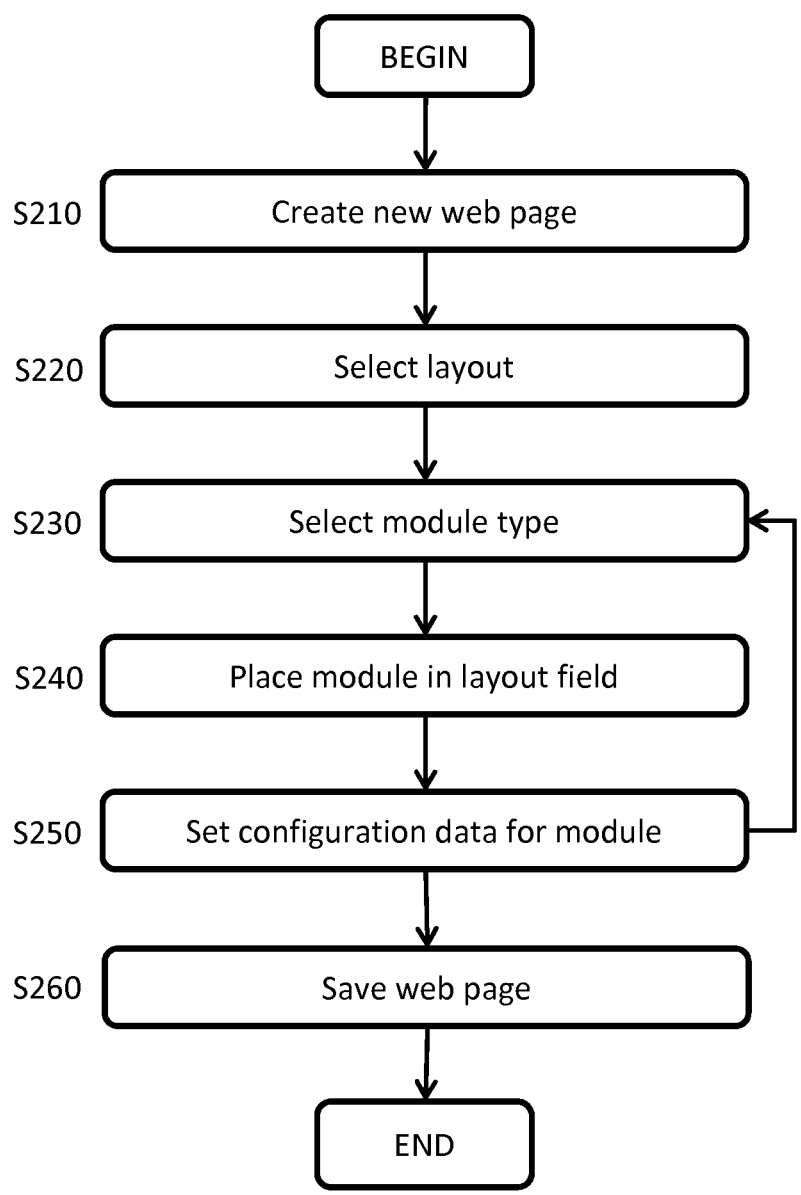

FIG. 3C

Welcome to The Website

Front Page    Store    Forum    Contact Us

| POSTS | POST DATE |
|---|---|
| First post | 01.01.2014 |
| Second post | 01.03.2014 |
| Third post | 01.12.2014 |
| Fourth post | 01.19.2014 |
| Fifth post | 01.27.2014 |
| Sixth post | 02.01.2014 |
| Seventh post | 02.03.2014 |
| Eighth post | 02.12.2014 |
| Ninth post | 02.19.2014 |
| Tenth post | 02.27.2014 |
| Eleventh post | 03.01.2014 |
| Re: Eleventh post | 03.03.2014 |

ATTENTION 6.20.2014: Lorem ipsum dolor sit amet, consectetur adipisicing elit, sed do eiusmod tempor incididunt ut labore et dolore magna aliqua.

BEST AVAILABLE IMAGE

BUY BUY BUY

SIMPLIFIED WEBSITE CREATION, CONFIGURATION, AND CUSTOMIZATION SYSTEM

CROSS-REFERENCE TO RELATED APPLICATIONS

This application is a continuation of U.S. application Ser. No. 15/919,056, now U.S. Pat. No. 11,475,097 issued Oct. 18, 2022, which is a continuation of U.S. patent application Ser. No. 14/328,639 filed Jul. 10, 2014, now U.S. Pat. No. 9,916,388 issued Mar. 13, 2018, which claims the benefit of U.S. Provisional Application No. 61/844,837, filed on Jul. 10, 2013 in the U.S. Patent and Trademark Office. All disclosures of said provisional application are incorporated herein by reference.

BACKGROUND OF THE INVENTION

1. Field of the Invention

The present invention relates to a web design product using web code in packages or modules. In particular, a series of existing module types, at least some of which containing dynamic code, may be arranged in an intuitive manner, and then published as a dynamic web page.

2. Description of the Related Art

With the importance of the Internet for modern communication, it has long been desirable to create and maintain a website. Dynamic web pages—that is, web pages with appearance or function at least partially based on input other than a direct change to the page's web code—are particularly useful for larger websites, as thousands of pages of content may be generated by a relatively short, if complex, programming script and an existing source of outside input such as a database.

However, the creation of a quality website requires the use of programming code, sometimes in a combination of programming languages. A dynamic web page can prove especially complex, but even a static web page is beyond the skill level of many.

What You See Is What You Get (often abbreviated as WYSIWYG) web design products have therefore been developed, which allow visual placement of text, images, links, and other website components into a simulated web page. The simulation is then converted to code that will render an identical and actual web page within a web browser. A WYSIWYG product allows those with no coding expertise to create a serviceable website in an intuitive manner.

However, most existing WYSIWYG products have limits to their functionality. One such limitation is that the components that may be placed are usually limited to those that can be expressed simply in the corresponding code; more complex objects are unavailable. This results in WYSIWYG products that cannot effectively create dynamic web pages, and therefore each page of content must be created individually. In particular, forums—dynamic web pages that allow a viewer to add their own content—are impossible to create in existing WYSIWYG products.

Therefore, a system that allows the creation of dynamic web pages such as forums in a WYSIWYG manner is desired.

SUMMARY OF THE INVENTION

While not limited thereto, an embodiment of the present invention is directed to a system including a module database comprising a plurality of module types expressed as at least web code, and a formatting interface comprising a selection menu presenting the plurality of module types for selection, a layout field into which one or more modules may be placed, each module being a copy of one of the plurality of module types, and a save control, wherein, upon activation of the save control, a web code on at least one web page of a website is altered such that an appearance of the at least web page reflects a placement of the one or more modules in the layout field.

According to an aspect of the invention, the web code for at least one module type of the plurality of module types may contain dynamic code.

According to an aspect of the invention, at least one of the plurality of module types is further expressed as configuration data, wherein, when a module that is a copy of the at least one of the plurality of module types is placed within the layout field, a configuration data of the module may be adjusted, and wherein, upon activation of the save control, a web code on at least one web page of a website is further altered such that an appearance of the at least web page reflects an adjustment of the configuration data of the at least one module.

According to an aspect of the invention, at least one of the plurality of module types may have fixed configuration data.

According to an aspect of the invention, all of the plurality of module types are further expressed as configuration data for a height and width, the height and width defining borders of a module, and the layout field is divided into a plurality of placement regions, each of the plurality of placement regions having a height and/or width, the height and width defining borders of the placement region, wherein borders of each of the one or more modules in the layout field must be aligned with borders of one or more of the plurality of placement regions.

According to an aspect of the invention, the website includes a hierarchy of web pages which are organized by branches, and each of the branches in the hierarchy includes a template which may be displayed in the layout field, the template comprising one or more modules, wherein, upon activation of the save control, if a template for a specific branch of the hierarchy is displayed in the layout field, web code on all web pages of the specific branch are altered such that appearances of all web pages of the specific branch reflects a placement of the one or more modules in the template displayed in the layout field, but web code on all web pages not of the specific branch are not altered.

According to an aspect of the invention, the website includes or consists of an online forum.

While not limited thereto, an embodiment of the present invention is directed to a method whereby a web code on at least one web page of a website is altered, using a formatting interface, by selecting at least one module from a plurality of module types expressed as at least web code, placing the at least one module in a layout field of the formatting interface, and activating a save control.

While not limited thereto, an embodiment of the present invention is directed to processing instructions for implementing one or more of the aforementioned systems or methods using one or more processors, encoded on one or more non-transitory computer readable mediums.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flowchart depicting a method of using the formatting interface to create a new web page, according to an embodiment of the invention

FIG. 3C is a possible web page resulting from the populated layout of FIG. 3B, according to an embodiment of the invention.

DETAILED DESCRIPTION OF THE EMBODIMENTS

Figure 1:
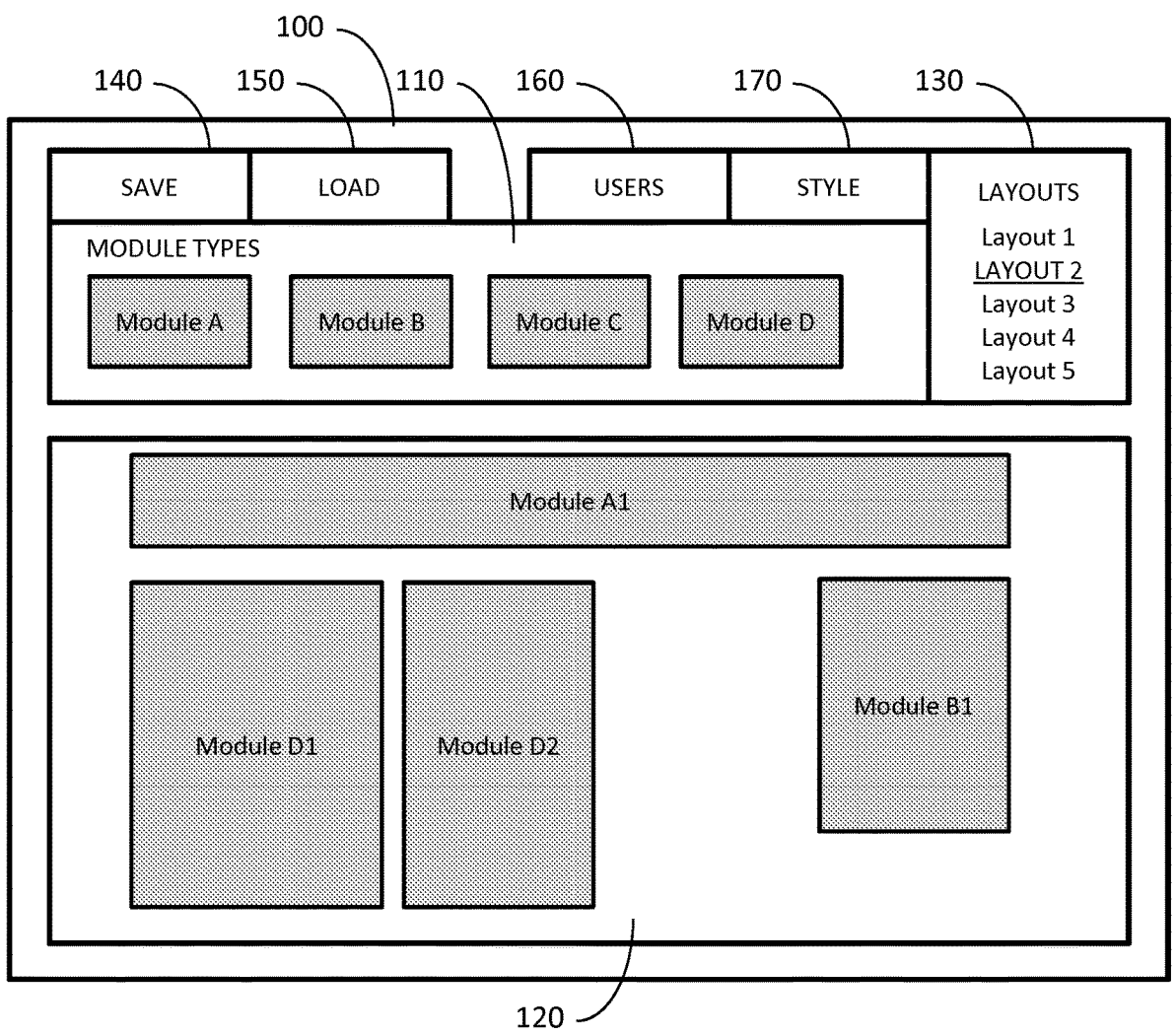
FIG. 1 is a depiction of a formatting interface arrangement, according to an embodiment of the invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

For the purposes of this description, the term "web code" means any programming code that, either by itself (e.g. basic HTML, client-side scripting) or after interpretation by other software (e.g. plugins, server-side scripting), by itself or in combination with other web code, can be interpreted by a web browser to present a web page. Web code may include but is not limited to code in HTML or XHTML, JavaScript, Flash, PHP, ASP or ASP.NET, Perl, or Python.

The invention may be applied to any dynamic web page—that is, a page with an appearance or function at least partially based on input other than a direct change to the page's web code—or collection of pages including at least one dynamic web page and collectively forming a website. One embodiment of the invention is in the context of a forum—that is, a series of dynamic web pages that allow a viewer to add their own content—and in places the description below assumes a forum; however, it is noted that the invention is not so limited.

1. Module-Based Web Pages

The invention expresses a web page as one or more modules arranged in a layout. The invention makes available a plurality of module types, a full list of which will vary from embodiment to embodiment.

For the purposes of this description, a module is a single instance, or copy, of a module type. In some embodiments, multiple modules of the same type may be placed on the same web page.

Each module type and each module is expressed as code, which determines both the basic appearance of a module and any functions it might perform or dynamic content it may generate.

For the purposes of this description, "dynamic code" encompasses any module code expressing a feature of a module that will change depending not only on the code itself but also on outside input, while "static code" encompasses any module code that is not dynamic code. "Dynamic content" is the representation of the dynamic code as seen or otherwise experienced using a web browser. A static module type contains only static code; static modules may contain images, text content, or static links, among other options. A dynamic module type is any module type that is not static, and generally will change some aspect of its appearance or function depending on the exact circumstances under which it is generated and observed as part of a web page.

One or more module types may also include configuration data which may, for each specific instance of a module, be adjusted. This configuration data may be expressed as additional code, or as parameters for existing code inside or outside the module code. In some embodiments and for some module types, the configuration data may have default values, or even fixed values. Although possible kinds of configuration data are numerous, a few will be described below.

The configuration data of a module type may include size parameters, for instance a height and width, which may be expressed in any convenient unit such as pixels, or percentage of the screen. In some embodiments, it may be convenient to limit the possible heights and widths of the modules or module types to whole number multiples of a specific unit of length. In some embodiments, it may be convenient to fix the height and/or width of one or more of the module types.

The configuration data of a module type may include static text, images, or other content that will appear in the specific instance of the module. In some module types (i.e. static module types), this static content will appear by itself, while in others it may appear alongside dynamically generated content.

The configuration data of a module type may include a source of outside content, such as the address of a syndication feed.

The configuration data of a module type may include a face, size, and/or color of a font of text in the module, or a width, style, and/or color of a border of the module, or a background color of the module.

A layout is a general page framework, comprising one or more sections into which modules may be placed. In some embodiments, multiple layouts may be available for selection. In some embodiments, at least one available layout may contain an unlimited number of sections, which are duplicated and arranged as needed to fit all modules. A layout may be expressed as simple web code, into which the code of selected modules may be inserted, or it may be expressed as an executable for the layout, or as parameters for a generic executable, the executable taking the code of the selected modules and generating a complete web page depending on their placement and configuration data. In some embodiments, the layout itself has its own configuration data, which may override configuration data in modules placed within.

Depending on the needs of the layout code or the resulting web pages, one or more sections may have limitations on which modules may be placed there. These limitations may be designated in numerous ways that will be apparent to those skilled in the art, but may include a simple list of ID numbers for allowed or disallowed modules wherein each module is given an ID number, or a list of categories of allowed or disallowed modules wherein one or more modules are so categorized, Also depending on the needs of the layout code or the resulting web pages, a module's appearance or behavior may be altered in certain ways depending on the layout or section into which it is placed. As one example, a module's width and/or height may be designated not by the module itself but a width and/or height parameter of the section into which it is placed. As another example, image content may be compressed in file size and/or visual presentation size, and video content within a module may be removed entirely, when placed in a layout designed for use in mobile phones.

2. System Components

A module-based web page generation system, and the interactions of its components, according to an embodiment of the invention, will now be described.

The system may be encoded on one or more non-transitory computer readable mediums. In some embodiments, the system is encoded on the same web server that hosts the web pages for access through the Internet. In some embodiments, the system is accessed remotely.

The system includes a module database which stores code defining the appearance and any operations of each module type, to be accessed as needed. The system also includes a formatting interface, which includes a selection menu, a layout field, a save control, and a load control.

FIG. 1 displays a possible arrangement of the formatting interface 100, according to an embodiment of the invention. It will be recognized that the placement and appearance of the interface components may vary wildly without departing from the scope of the invention.

The selection menu 110 presents a plurality of available module types for selection. The menu 110 may take any form that will allow the available module types to be viewed and selected: for instance, a text list, a drop-down menu, a series of images, or other arrangements which will be well known to those of skill in the art. The selection menu 110 may also be divided into submenus for easier presentation. The module types may be organized in numerous ways, such as by type category or in alphabetical order. In the embodiment depicted in FIG. 1, a series of images is used for the selection menu 110.

When a module type is selected from the selection menu 110, a module of that type is made available within the layout field 120, which displays a visual simulation of the page to be created. The module may be placed in a desired location within the layout field 120. In embodiments where a particular module has configuration data which may be adjusted, said adjustment may occur at this time. Control mechanisms to accomplish these tasks are well known to those skilled in the art, but may include drag-and-drop from the selection menu 110 for placement, and a pop-up menu with input fields for adjustment of configuration data.

Figure 3A:
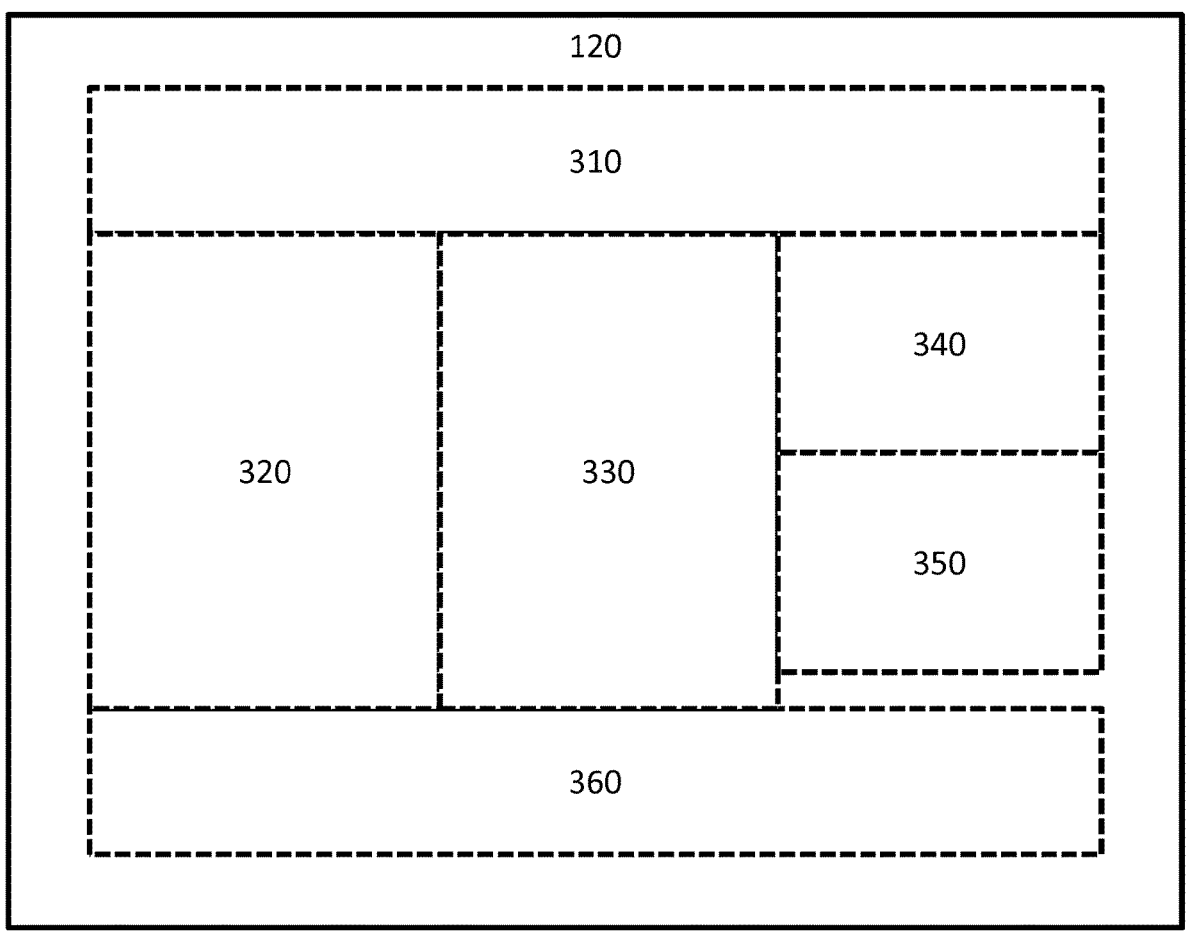
FIG. 3A is a sample layout within the layout field, according to an embodiment of the invention.

In some embodiments, the layout field 120 is divided into an arrangement of placement regions (one such arrangement is depicted in FIG. 3A, described below), and the edge of each module must be placed in alignment with the borders of one or more placement regions. These placement regions are reflective of the sections of the layout, as elaborated on above. The heights and widths of one or more of these placement regions may be limited to whole number multiples of a specific unit of length, which matches a unit of length used to determine possible heights and widths of the modules or module types. The placement regions may be arranged as a simple grid, or in a more complicated arrangement. In some embodiments, one or more placement regions may have additional, non-size limitations on which modules may be placed there; for instance, a masthead module (described below) might not be placeable in a centrally located placement region.

In some embodiments, the system also includes a layout menu 130, which displays one or more possible layouts. Selection of a layout presents an arrangement of divisions of the layout field 120 into placement regions, the arrangement reflecting the sections of the selected layout. The layout menu 130 may take any form that will allow the available layouts to be viewed and selected: for instance, a text list, a drop-down menu, a series of images, or other arrangements which will be well known to those of skill in the art. In some embodiments, the layout menu 130 may only be available at the beginning of the web page creation process.

In embodiments where a plurality of layouts is available, the system includes a layout database, which stores the code for each layout to be accessed as needed.

The save control 140 may be a simple button control or equivalent. When the save control 140 is activated, web code is generated which, when rendered in a web browser, displays the modules as arranged and configured in the layout field 120. This code is then copied (or "published") to a designated location accessible through a network such as the Internet.

In some embodiments, the save control 140 also presents an alternative option to save the code locally, without making it accessible over a network. Additionally, the code may be saved in a form other than web code, such as a file containing a layout designation, module designations for each placement region of the designated layout, and configuration data for each designated module, Still other options are also possible without departing from the scope of the invention.

The load control 150, when activated, presents a list of existing web pages for selection. When an existing web page is selected from the load control 150, the arrangement and configuration of the modules from that web page are recalled to the layout field. Alterations to the arrangement and configuration may then be made. When the save control 140 is activated for a loaded and altered web page, options are presented, and depending on the selected option, the new resulting code may replace the old code for that page at its designated location, or may be published as a new web page at a new designated location; other options are also possible. The load control 150 may also contain a control to create a new web page, or this option may be located elsewhere in the formatting interface 100.

In some embodiments, the load control 150, when activated, presents a hierarchy menu, which organizes the existing web pages as a hierarchy, along with templates applied to an entire branch of the hierarchy. When the save control 140 is activated for a new page, an alternative option to save the arrangement and configuration of the modules in the layout field as a branch template is also presented. This branch template may be loaded later through the hierarchy menu, whereupon the template is recalled to the layout field. Alterations to the arrangement and configuration may then be made. When the save control 140 is activated, options are presented, and depending on the selected option, the new resulting code may replace the old code for that template, be saved as a new template in a sub-branch of the existing template's branch, be saved as a new template separate from the existing template, or be published as a new web page designated as part of the existing template's branch; other options are also possible. When the code for an existing template is changed, the same code changes also affect any templates or web pages within the branch of the changed templates, although modules and unique configuration data of the web pages or templates within that branch will be unaffected. Also, templates or web pages not within the branch are not affected at all.

The branches of the hierarchy may reflect sections within the resulting website. For instance, where the website is an online forum, the branches of the hierarchy may reflect a hierarchy of subforums. Or, the website may contain a forum but also other features, in which case one branch of the hierarchy may be the forum, with sub-branches as subforums. It is also possible, and sometimes convenient, to place all pages of the website under a single branch, wherein a change to the template changes all pages of the website accordingly.

In other embodiments, the hierarchy menu exists but is separate from the load control 150, and lists only existing templates, while the load control 150, when activated, presents only existing web pages. In still other embodiments, no hierarchy menu exists.

In some embodiments, the formatting interface 100 may include further components. For instance, in embodiments where one or more modules present the ability to log in as a user, the interface may include a user categorizer tool 160. The user categorizer tool 160, when activated, presents options to create a new category of user as well as amend or delete existing user categories. Each user category includes a category name and a series of privileges which may be toggled; possible privileges may vary by embodiment, but may include the ability to access specific pages of the website, or the ability to use the functions of specific types of modules.

Also, in some embodiments, the formatting interface 100 may include a style selector tool 170, which when activated allows various style parameters for the web page to be set. The style parameters may include a background color or image for the page. The style parameters may also affect the appearance of modules on the page; for instance, a face, size, and/or color of a font of text in the modules, or a width, style, and/or color of a border of the modules, or a background color of the modules. In various embodiments, these parameters may override, or be overridden by, configuration data for each module, or an option may be presented as to which overrides. In some embodiments, the configuration data of the layouts may all or a subset of these style parameters.

Also, in some embodiments, the formatting interface 100 may include a developer interface (not depicted). The developer interface may receive code and/or configuration data for a new module type or layout, which can then be stored to the module database or layout database, respectively. The developer interface may also be a separate feature of the system from the formatting interface, presented in a different context.

The flowchart of FIG. 2 depicts a general method of using the formatting interface 100 to create a new web page, according to an embodiment of the invention.

At S210, a user selects an option to create a new web page, for instance from the load control 150. At S220, the user selects a layout from the layout menu 130; in the depicted embodiment, the layout may not be changed once selected, although other embodiments may allow for later changes to the layout.

At S230, the user selects a module type from the selection menu 110, and places the corresponding module at its desired location in the layout field 120 at S240. At S250, configuration data for the placed module may be set.

The user may then return to S230 to select, place, and configure another module, or the user may continue to S260 and operate the save control 140. This operation saves the code for the web page to the desired location.

3. Examples of Module Types and Layout Sections

Although there is no limit to the types of modules possible in the present invention, beyond the limits of web code itself, a few possibilities will now be described.

One type of module may be a masthead module. The module, when rendered in a web page, will display a logo and/or navigation links, and is preferably although not always placed at or near the top of the layout field. The configuration data for the masthead module may include an image for the logo, link text, and link destination(s). The navigation links may lead to other locations in the website; if the website or a portion thereof is a forum, the navigation links may link to other posts or pages in the forum. The masthead module may in some embodiments be a static module, but may in other embodiments be dynamic if the logo and/or the links are selected or generated dynamically. In embodiments employing a hierarchy, the masthead module is preferably a constant across at least a branch of the hierarchy.

One type of module may be a navigation module. The module, when rendered in a web page, will display one or more navigation links. The navigation links may lead to other locations in the website; if the website or a portion thereof is a forum, the navigation links may link to other posts or pages in the forum. The masthead module may in some embodiments be a static module, but may in other embodiments be dynamic if the links are selected or generated dynamically.

One type of module may be a post list module. The module, when rendered in a web page, will display a series of posts (that is, user- or viewer-added content), and may also contain navigation controls to move through the series of posts in a convenient manner. The configuration data for the post list module may include a default sort order for the posts, such as Most Recent First.

One type of module may be a user list module. The module, when rendered in a web page, will display a series of registered users, and may also contain navigation controls to move through the series of users in a convenient manner. The configuration data for the post list module may include a default sort order for the posts, such as Alphabetical or Post Count.

One type of module may be an arbitrary content module. The configuration data for the post list module may include HTML code. The module, when rendered in a web page, will render the HTML code in the configuration data.

One type of module may be an announcement module. The module, when rendered in a web page, will display one or more announcements. The configuration data for the post list module may include an announcement source feed address.

One type of module may be an advertising module. The module, when rendered in a web page, will display a received advertisement. The configuration data for the post list module may include an advertisement source feed address.

Available module types may include two or more that serve the same general function while having differences in structure or style. As one example, multiple post list module types may be available, wherein a first post list module type organizes posts as a branching list with optional internal borders (for instance, in the style of a WordPress® comment thread), while a second post list module type organizes posts vertically and with borders between posts (for instance, in the style of a UBB® thread). As another example, multiple advertising module types of various fixed sizes may be available.

Figure 3B:
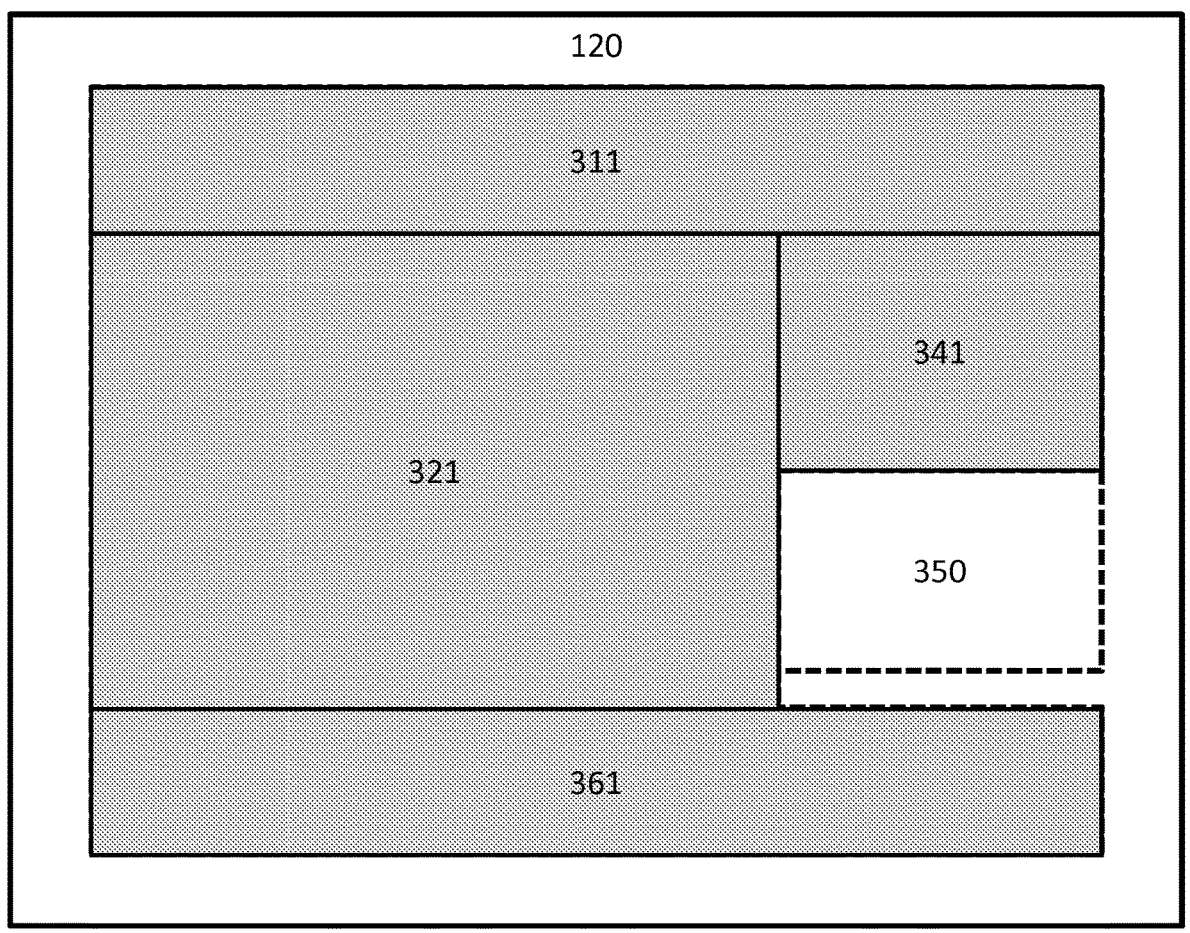
FIG. 3B is the sample layout of FIG. 3A with modules added, according to the embodiment of the invention.

A sample layout is now presented in FIG. 3A, as it appears in the layout field 120 according to an embodiment of the invention. The layout consists of a header section 310 of both fixed height and width, two horizontally arranged body sections 320 and 330 of fixed width but non-fixed height, two vertically arranged body sections 340 and 350 of fixed width but non-fixed height, and a footer section 360 of both fixed height and width. In FIG. 3B, modules have been added: a masthead module 311 has been placed in the header section 310, a post list module 321 has been placed across both horizontally arranged body sections 320 and 330, an announcement module 341 has been placed in the first vertically arranged body section 340, an advertising module 361 has been placed in the footer section 360, and the second vertically arranged body section 350 has been left vacant (but may be filled at a different level in the hierarchy, if a hierarchy exists).

A webpage resulting from the arrangement in FIG. 3B is depicted in FIG. 3C, according to an embodiment of the invention.

4. Advantages of the Invention

Because of the modular nature of the web pages created using the invention, numerous complicated modules may be made available, and intuitively arranged and configured by a system operator with no understanding of the underlying code. Additionally, developers with coding experience may create additional types of modules or additional layouts within the system, which may be made available to the system operators. Thus, a dynamic web page such as a forum may be created to match the needs of a particular system operator.

It is also noted that, when expressed as a series of modules, at least some of which contain dynamically generated content, a website that would otherwise contain a large number of individual web pages may be reduced to a few web pages, or even one web page, where the differences between pages are produced by regenerating the dynamically generated content. For instance, an effective forum may be created using two pages: a front page with a module displaying a list of threads (alongside other, optional modules), and a thread page with a module displaying a list of posts in a selected thread (again, alongside other, optional modules). The result is a greater efficiency in both coding time and digital storage space. This advantage of dynamic content is already known to those of skill in the art, but has always been counter-balanced by the skill level required to create dynamically generated pages, which has now been overcome by this invention.

Additionally, a description of a webpage may be expressed as a layout name, a name of a module type contained in each section of the layout, and certain configuration data, with the remaining needed information accessible from the module and layout databases and other system code. This short description further reduces the need for digital storage space, even when storing a large number of pages with different arrangements.

Although a few embodiments of the present invention have been shown and described, it would be appreciated by those skilled in the art that changes may be made in this embodiment without departing from the principles and spirit of the invention, the scope of which is defined in the claims and their equivalents. In particular, all or some of the above mentioned embodiments may be selectively combined with each other.

What is claimed is:

1. A method comprising:
   presenting a list of existing web pages upon activation of a load control;
   selecting a webpage layout from the list of web pages for selection, wherein the webpage layout includes a plurality of placement regions configured to support an arrangement of a plurality of modules placed within the plurality of placement regions;
   placing each module selected from the plurality of modules within a selected region of the plurality of placement regions; and
   altering a web code on a web page of a website and an appearance of the web page associated with the webpage layout to reflect a placement of a selected module of the plurality of modules in its corresponding placement region of the plurality of placement regions,
   wherein the website is a hierarchy organized as a plurality of branches with each branch having one or more web pages, and
   wherein the altering of the web code comprises generating new resulting code for the selected module of the plurality of modules, replacing old code associated with each module of the plurality of modules with the new resulting code along with old code within other web pages within a first branch of the website featuring the web page and the other web pages.

2. The method of claim 1, wherein each of the plurality of modules includes code include that controls both an appearance of the selected module and functions associated with the code.

3. The system of claim 1 further comprising a layout database, the layout database comprising a plurality of layouts including the webpage layout.

4. The system of claim 3, wherein each of the plurality of layouts is expressed as at least web code, parameters for an executable program, or executable code.

5. The system of claim 1, wherein each module of the plurality of modules is selected from a viewable menu.

6. The system of claim 1, wherein the altering of the web code comprises generating the web code to display the plurality of modules in response to a save control being activated.

7. The system of claim 1, wherein the altering of the appearance of the web pages is based, at least in part, on an adjustment of configuration data of at least the selected module of the plurality of modules.

8. The system of claim 7, wherein the configuration data includes information associated with a height and a width of the module, the height and width of the selected module defining borders of the selected module.

9. The system of claim 7, wherein the configuration data including an address of a syndication feed.

10. A non-transitory computer readable medium encoding instructions thereon that, upon execution, perform operations comprising:
    presenting a list of existing web pages upon activation of a load control;
    selecting a webpage layout from the list of web pages for selection, wherein the webpage layout includes a plurality of placement regions configured to support an arrangement of modules placed within the plurality of placement regions;
    placing each module selected from the modules within a selected region of the plurality of placement regions; and
    altering a web code on a web page of a website and an appearance of the web page associated with the webpage layout to reflect a placement of a selected module of the modules in its corresponding placement region of the plurality of placement regions,
    wherein the website is a hierarchy organized as a plurality of branches with each branch having one or more web pages,
    wherein the altering of the web code comprises generating new resulting code for the selected module of the plurality of modules, replacing old code associated with each module of the plurality of modules with the new resulting code along with old code within other web pages within a first branch of the website featuring the web page and the other web pages.

11. The non-transitory computer readable medium of claim 10, wherein each of the modules includes code include that controls both an appearance of the module and functions associated with the code.

12. The non-transitory computer readable medium of claim 10, wherein the instructions are configured to access a layout database, the layout database comprising a plurality of layouts including the webpage layout.

13. The non-transitory computer readable medium of claim 12, wherein each of the plurality of layouts is expressed as at least web code, parameters for an executable program, or executable code.

14. The non-transitory computer readable medium of claim 10, wherein each module of the modules is selected from a viewable menu.

15. The non-transitory computer readable medium of claim 10, wherein the altering of the web code comprises generating the web code to display the modules in response to a save control being activated.

16. The non-transitory computer readable medium of claim 10, wherein the altering of the appearance of the web pages is based, at least in part, on an adjustment of configuration data of at least the selected module of the modules.

17. The non-transitory computer readable medium of claim 16, wherein the configuration data includes information associated with a height and a width of the selected module, the height and width of the selected module defining borders of the selected module.

18. The non-transitory computer readable medium of claim 16, wherein the configuration data including an address of a syndication feed.

19. A method comprising:
presenting a list of existing web pages upon activation of a load control;
selecting a webpage layout from the list of web pages for selection, wherein the webpage layout includes a plurality of placement regions configured to support an arrangement of a plurality of modules placed within the plurality of placement regions;
placing each module selected from the plurality of modules within a selected region of the plurality of placement regions; and
altering a web code on a first web page of a website and an appearance of the web page associated with the webpage layout to reflect a placement of a selected module of the plurality of modules in its corresponding placement region of the plurality of placement regions,
wherein the website is a hierarchy organized as a plurality of branches with each branch being associated with one or more web pages including the first web page and a second web page, and
wherein the altering of the web code comprises generating new resulting code for the selected module of the plurality of modules, replacing old code associated with the selected module of the plurality of modules with the new resulting code within the first web page, and replacing old code associated with at least one module corresponding in placement to the selected module within the second web page of the one or more web pages within a first branch of the website featuring at least the first web page and the second web page.

* * * * *